May 19, 1925.	1,538,530
N. Y. TROIDL
EDUCATIONAL APPLIANCE
Filed June 18, 1924
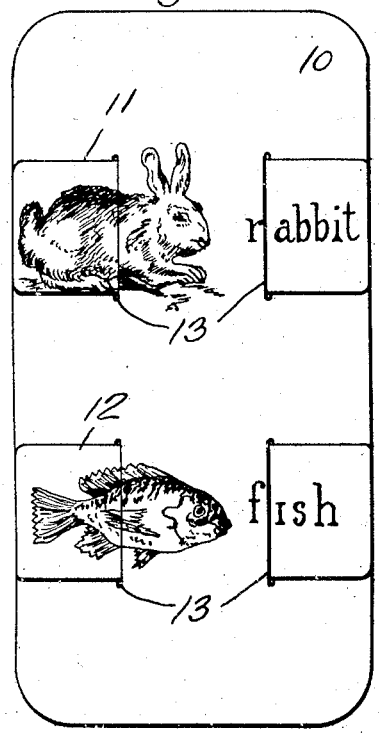
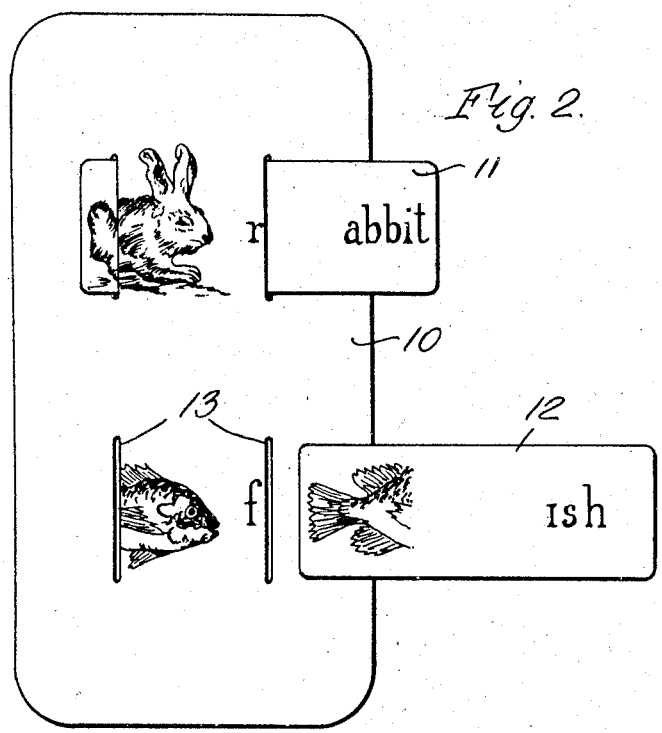
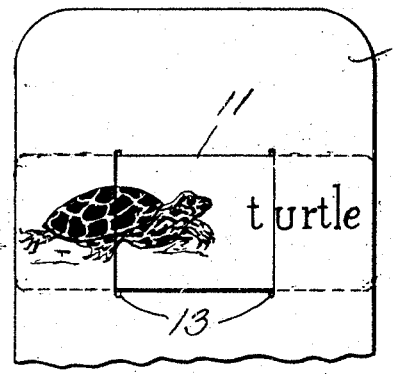
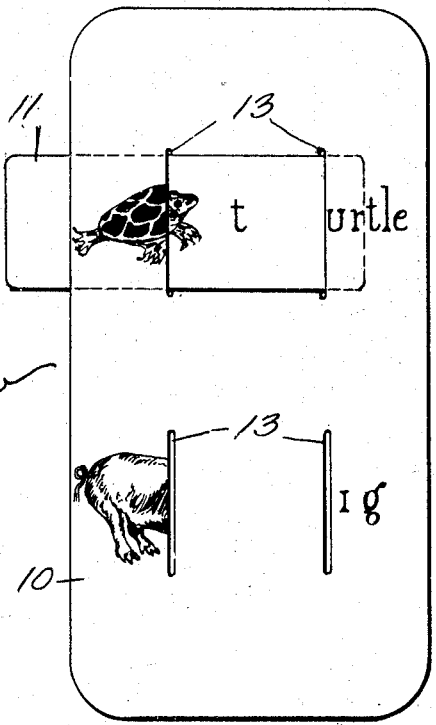
INVENTOR.
Nellie York Troidl,
by Parker, Rockwood & Bean.
ATTORNEYS.

Patented May 19, 1925.

1,538,530

UNITED STATES PATENT OFFICE.

NELLIE YORK TROIDL, OF NIAGARA FALLS, NEW YORK.

EDUCATIONAL APPLIANCE.

Application filed June 18, 1924. Serial No. 720,764.

*To all whom it may concern:*

Be it known that I, NELLIE YORK TROIDL, a citizen of the United States, residing at Niagara Falls, in the county of Erie and State of New York, have invented a new and useful Improvement in Educational Appliances, of which the following is a specification.

This invention relates to educational appliances or cards for use in teaching or imparting knowledge to, and entertaining young children, especially in school work.

More particularly the invention relates to that kind of appliance which consists of a set of cards or members, each of which is provided with one or more separable slips or pieces each bearing words, symbols, characters or other matter related or complementary matter or pictorial representations of objects on the card or member. These slips are retained on the cards or members in such a way that the cards or members can be readily handled without danger of detaching the slips, while the slips nevertheless can be readily connected to or disconnected from the cards or members. Preferably, the members consist of cards made of thin, stiff and durable material, such as the cardboard used for ordinary playing cards, and the slips are made of the same material, so that the cards and slips can be readily handled and indiscriminately mixed with ease, and so that the cards with the slips thereon can be stacked and stored in a limited space.

In the use of the cards, the slips are detached from the cards and the cards and slips mixed indiscriminately, the problem for the child being to select and apply each slip to its appropriate card, thereby learning to properly associate the related matter on the cards and slips.

One object of the present invention is to provide a set of cards or members of the sort mentioned which are especially adapted to facilitate the teaching of phonetic spelling.

Another object is to provide a set of cards and separable slips therefor, in which each card and its slip or slips are each provided on one or both sides with complementary portions of a representation of an object, or of a word or symbol, or both, such that when the slip is correctly associated with the proper card, the representation of the object or the word or symbol will be completed. By the use of the cards of this invention, the children are trained to use their powers of observation in selecting the complementary portions of different depicted objects and the names thereof. For instance, each card may have thereon a portion of a picture or representation of an animal, and preferably also one or more letters or syllables of the name of the animal, while the slip for that card would have on it the complementary portion of the animal's picture and of the name thereof, so that when correctly assembled the card and slip together will produce the complete or whole picture and name of the animal.

In the accompanying drawings:—

Fig. 1 is a view of one face of a card with two separable slips assembled thereon, said card and each slip having complementary matter displayed thereon in accordance with the preferred embodiment of my invention.

Fig. 2 is a similar figure showing one of the slips partly removed, and the other slip entirely removed from the card.

Fig. 3 is a fragmentary view of the opposite face of the card shown in Fig. 1.

Fig. 4 is a view of said opposite face of the card with the slips in removed positions, as shown in Fig. 2.

As shown in the drawings, the card 10 is provided with two detachable or removable slips, designated respectively 11 and 12. Any desired number of the cards 10 may constitute a set. The slips are retained on the card by providing the latter with two spaced narrow slits 13 for each slip, so arranged that the ends of the slip may be easily inserted through the slits, thereby holding the slip in place on the card with portions of the slip exposed at opposite sides of the card. Preferably, the slips are equal in length to the width of the card so that the slips will not project beyond the edges of the card, and the slits 13 are spaced apart sufficiently to hold the slip firmly and stably in position on the card, thereby preventing the accidental dislodgement or displacement of the slips when stacking, mixing or otherwise handling the cards.

In the particular embodiment of the invention illustrated, the card 10 is provided on one face with portions of pictures of two different objects, for instance, see Fig. 1, a portion of a rabbit is illustrated adjacent one of the upper slits 13, while a portion of a fish is illustrated adjacent one of the lower slits 13. The card also has the letter "r" displayed thereon adjacent the other upper slit 13, while the letter "f" is similarly displayed adjacent the remaining lower slit 13, these letters being the first letters respectively of the words "rabbit" and "fish."

The slips 11 and 12, as clearly shown in Fig. 1, are suitably provided at their opposite end portions on one face of the slip with the remaining portions of the pictures and the remaining portions of the names appearing on the card, and the relative positions of these portions of the representations on the slips are such that when the slips have been properly inserted in their respective slits in the card, as in Fig. 1, the complementary portions of each picture and the complementary portions of each word will be combined to make a complete picture of the object associated with its completed name. More than one letter or part of the names of the objects pictured may appear on the card in the manner stated, but preferably the words are divided in accordance with the rules adopted in phonetic spelling.

If desired, the card and slip may be provided with complementary portions of the representation or picture of an object only, without the accompanying portions of the name or word; or alternatively, the card and slip may be provided on their adjacent parts with complementary portions of a word, name or symbol only, without the pictorial representation of an object. However, the use of the cards and their cooperating slips for the presentation of complementary portions of pictured objects and their names is particularly desirable, as the children are thereby enabled to learn in an entertaining way the phonetic or sound values of different letters or syllables, as for instance the "r" and "f" sounds in the card shown in Fig. 1.

The capacity of a set of cards of a given number may be doubled by using both faces of the cards and both faces of each slip, as illustrated in the drawings. For example, Figs. 3 and 4 show the reverse face of the card 10 illustrated in Fig. 1, together with the reverse faces of the cooperating slips 11 and 12 therefor. In this case the reverse face of the card 10 bears fragmentary pictorial and word representations respectively of two objects, which are completed by the complementary pictorial and word representations on the middle portion of the slips, or those portions of the slips which extend between the slits 13.

While the card illustrated and described is equipped with plural slips 11 and 12, and is provided with pictures and words, or representations on both faces thereof, my invention is not limited to any particular number of the representations on a card, and each card may be provided with only one or any other desired number of slips and representations.

I claim as my invention:

1. In an educational appliance, a thin card, and a separate slip detachably engaging widely spaced integral parts of the card whereby the slip is removably retained on said card with a portion of said slip exposed at one face of the card, said card having displayed thereon a portion of a word or the like, and said slip bearing on its exposed portion a complementary portion of said word or the like, so that when said slip is in place on the card, said complementary portions will be combined to complete said word or the like, said slip when in place on the card not projecting beyond the edges of the card.

2. In an educational appliance, a thin card, and a separate slip detachably engaging widely spaced integral parts of the card whereby the slip is removably retained on said card with a portion of said slip exposed at one face of the card, said card having displayed thereon a portion of a pictorial representation of an object, and said slip bearing on its exposed portion a complementary portion of said pictorial representation so that when said slip is in place on the card said complementary portions of said pictorial representation will be combined to form the complete picture of said object, said slip when in place on the card not projecting beyond the edges of the card.

3. In an educational appliance, a thin card, and a separate slip detachably engaging widely spaced integral parts of the card whereby the slip is removably retained on said card with a portion of said slip exposed at one face of the card, said card having displayed thereon a portion of a pictorial representation of an object and also a portion of the name of the object, and said slip bearing on its exposed portion complementary portions of said pictorial and word representations so that when said slip is in place on the card said complementary portions of said pictorial and word representations on said card and slip respectively will be combined to form a complete picture and a complete name of the object, said slip when in place on the card not projecting beyond the edges of the card.

4. In an educational appliance, a thin card, and a separate slip, said card having a pair of widely spaced slits in which said slip is removably retained so as to expose portions of said slip at one face of said card, said card having displayed thereon a portion of a pictorial representation of an object adjacent one of said slits, and a portion of the name of the object adjacent the other slit, and said slip bearing on its exposed portions the complementary portions of said pictorial and word representations adjacent said slits so that said complementary portions of said pictorial and word representations will be combined to form a complete picture and a complete name of the object.

5. In an educational appliance, a thin card, and a separate slip removably retained on said card with portions of said slip exposed at opposite faces of said card, said card having displayed on each face thereof portions of a pictorial and of a word representation of an object, and said slip having displayed on the respective faces thereof complementary portions of said pictorial and word representations of said object on the corresponding face of the card, whereby when said slip is in place on the card, the complementary portions of said pictorial and word representations on each face of said card and of said slip will be combined to form a complete picture and name of the object.

6. In an educational appliance, a card and a slip removably retained on said card with portions of said slip exposed at opposite sides of the card, each side of said card and the portion of said slip exposed at said side of the card having depicted thereon co-ordinated matter which when the slip is in place on the card completes a representation on each of the opposite sides of the card.

NELLIE YORK TROIDL.